United States Patent
Murakita (10) Patent No.: US 9,143,669 B2
(45) Date of Patent: Sep. 22, 2015

(54) IMAGING DEVICE AND METHOD, AND PROGRAM

(71) Applicant: Sony Corporation, Tokyo (JP)

(72) Inventor: Masashi Murakita, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/913,820

(22) Filed: Jun. 10, 2013

(65) Prior Publication Data

US 2013/0335583 A1 Dec. 19, 2013

(30) Foreign Application Priority Data

Jun. 18, 2012 (JP) ................................. 2012-137058

(51) Int. Cl.
*H04N 5/222* (2006.01)
*H04N 5/235* (2006.01)
*H04N 5/225* (2006.01)

(52) U.S. Cl.
CPC ........... *H04N 5/2256* (2013.01); *H04N 5/2354* (2013.01)

(58) Field of Classification Search
CPC ............................. H04N 5/2256; H04N 5/2354
USPC ........................................ 348/207.1, 362, 371
See application file for complete search history.

(56) References Cited

U.S. PATENT DOCUMENTS

| | | | | |
|---|---|---|---|---|
| 4,256,391 A | * | 3/1981 | Kitaura | 396/169 |
| 4,593,312 A | * | 6/1986 | Yamasaki | 348/371 |
| 4,771,309 A | * | 9/1988 | Ogihara et al. | 396/61 |
| 2011/0187920 A1 | * | 8/2011 | Shimada et al. | 348/371 |

FOREIGN PATENT DOCUMENTS

JP        2002-124394 A     4/2002

* cited by examiner

*Primary Examiner* — Trung Diep
(74) *Attorney, Agent, or Firm* — Hazuki International, LLC (57) ABSTRACT

Disclosed herein is an imaging device including: a light emission control section configured to obtain a delay time from issuance to a flash of a light emission trigger indicating light emission start timing of the flash to reaching of a predetermined value by light emission luminance of the flash; an imaging control section configured to control exposure start timing on a basis of the delay time; and a correction amount calculating section configured to calculate, on the basis of the delay time, an amount of correction used when brightness of a taken image taken from the exposure start timing is corrected.

6 Claims, 5 Drawing Sheets

IMAGING DEVICE AND METHOD, AND PROGRAM

CROSS-REFERENCE TO RELATED APPLICATION

The present application claims priority from Japanese Patent Application No. JP 2012-137058 filed in the Japanese Patent Office on Jun. 18, 2012, the entire content of which is incorporated herein by reference.

BACKGROUND

The present technology relates to an imaging device and an imaging method, and a program, and particularly to an imaging device and an imaging method, and a program that can achieve proper light control even at a high shutter speed.

In related art, when an imaging device performs flash photographing at a shutter speed equal to or higher than a synchronization speed, a subject is illuminated and light control is performed by flat light emission (see Japanese Patent Laid-Open No. 2002-124394, for example). Flat light emission refers to continuous emission of flash light by which a similar effect to that of steady-state light can be obtained.

SUMMARY

However, when the imaging device in related art performs flash photographing at a high shutter speed, it may be difficult to perform proper light control due to effect of ripples of flat light emission.

The present technology has been created in view of such a situation. It is desirable to be able to achieve proper light control even at a high shutter speed.

According to an embodiment of the present technology, there is provided an imaging device including: a light emission control section for obtaining a delay time from issuance to a flash of a light emission trigger indicating light emission start timing of the flash to reaching of a predetermined value by light emission luminance of the flash; an imaging control section for controlling exposure start timing on a basis of the delay time; and a correction amount calculating section for calculating, on the basis of the delay time, an amount of correction used when brightness of a taken image taken from the exposure start timing is corrected.

The imaging device can further include a light emission luminance calculating section for calculating the predetermined value for the light emission luminance of the flash on a basis of a distance from the imaging device to a subject, wherein when the flash detects the delay time corresponding to the predetermined value for the light emission luminance of the flash, the predetermined value being calculated by the light emission luminance calculating section, from a table showing relation between the light emission luminance and the delay time, the light emission control section can then obtain the delay time detected by the flash.

The imaging control section can set the exposure start timing on a basis of timing in which the delay time has passed from the issuance of the light emission trigger.

The imaging control section can set timing in which a predetermined exposure time has passed from the exposure start timing as exposure end timing, and the correction amount calculating section can calculate the amount of correction on a basis of the light emission luminance in the exposure start timing and the light emission luminance in the exposure end timing.

The predetermined exposure time can be set within a period of monotonic increase of the light emission luminance of the flash after the light emission trigger is issued or within a period of monotonic decrease of the light emission luminance of the flash after the light emission luminance monotonically increases and reaches a peak.

The imaging control section can set the exposure start timing on a basis of timing in which the light emission luminance of the flash reaches the peak.

An imaging method and a program according to an embodiment of the present technology are a method and a program corresponding to the imaging device according to the above-described embodiment of the present technology.

In the imaging device and the imaging method and the program according to the embodiment of the present technology, a delay time from issuance to a flash of a light emission trigger indicating light emission start timing of the flash to reaching of a predetermined value by light emission luminance of the flash is obtained, exposure start timing is controlled on a basis of the delay time, and an amount of correction used when brightness of a taken image taken from the exposure start timing is corrected is calculated on the basis of the delay time.

As described above, according to the present technology, proper light control can be achieved even at a high shutter speed.

DETAILED DESCRIPTION OF THE PREFERRED EMBODIMENT

[Ripples of Flat Light Emission]

First, in order to facilitate understanding of the present technology, description will be made of effect of ripples of flat light emission when imaging is performed at a shutter speed equal to or higher than a predetermined speed.

Figure 1:
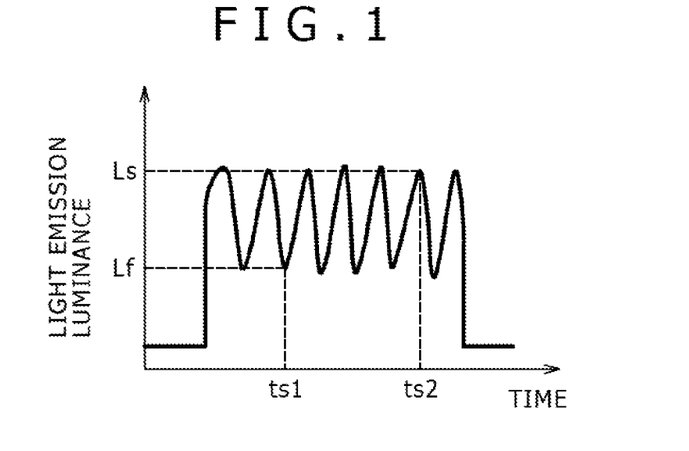
FIG. 1 is a diagram showing temporal changes in light emission luminance in flat light emission.

FIG. 1 is a diagram showing temporal changes in light emission luminance in flat light emission. In FIG. 1, an axis of abscissas represents a time axis, and an axis of ordinates indicates light emission luminance. As shown in FIG. 1, light emission luminance periodically changes in a light emission period.

A waveform representing the temporal changes in light emission luminance in the flat light emission has a ripple frequency of 30 kHz to 50 kHz, and has peak value variations of about 1 Ev. Therefore, when imaging is performed at a shutter speed of one hundred-thousandth of a second, for example, which is equal to or higher than the predetermined speed, exposure variations of a maximum of about 1 Ev occur depending on timing of exposure.

Specifically, because exposure is performed irrespective of the ripples of the flat light emission, exposure may be performed in timing of a time ts1, or exposure may be performed in timing of a time ts2. In this case, as shown in FIG. 1, exposure is performed with flash light of a light emission luminance Lf in the timing of the time ts1, whereas exposure is performed with flash light of a light emission luminance Ls, which is brighter than at the time ts1, in the timing of the time ts2.

Thus, when imaging is performed at a shutter speed equal to or higher than the predetermined speed, the effect of the ripples of the flat light emission may render proper light control difficult.

Accordingly, the present inventor et al. developed a method according to an embodiment of the present technology as described in the following to realize proper light control even at a shutter speed equal to or higher than the predetermined speed.

[Outline of Method According to Embodiment of Present Technology]

An outline of the method according to the embodiment of the present technology will be described to facilitate understanding of the method according to the embodiment of the present technology.

FIGS. 2A to 2D are diagrams of assistance in explaining the method according to the embodiment of the present technology.

Figure 2A:
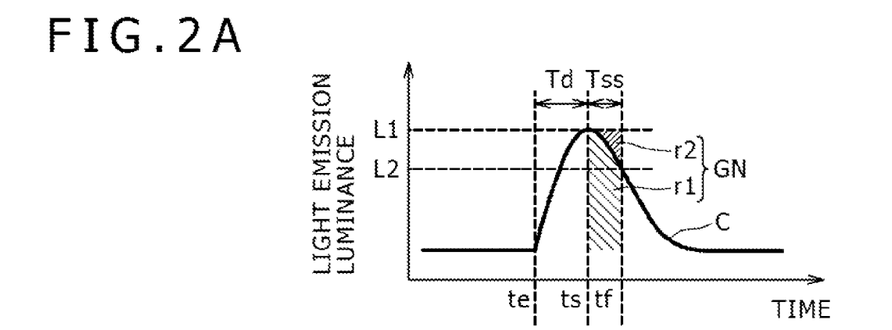
FIGS. 2A to 2D are diagrams of assistance in explaining a method according to an embodiment of the present technology.

FIG. 2A is a timing chart of luminance of light emission (hereinafter referred to as main light emission) by an external flash at a time of imaging for recording by an imaging device to which the present technology is applied. In FIG. 2A, an axis of abscissas represents a time axis, and an axis of ordinates indicates light emission luminance.

Figure 2B:
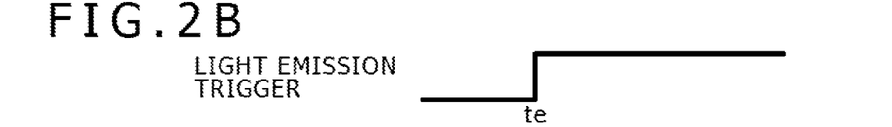

FIG. 2B is a timing chart of timing of issuing a light emission trigger to an external flash 21 (see FIG. 3 to be described later). When the light emission trigger indicating light emission start timing is issued from a main body portion of an imaging device 1 (see FIG. 3 to be described later), the external flash 21 performs main light emission. Incidentally, in the following, a part obtained by excluding the external flash 21 from the imaging device 1 to which the present technology is applied will be referred to as the main body portion 101 of the imaging device 1 (see FIG. 3 to be described later).

Figure 2C:
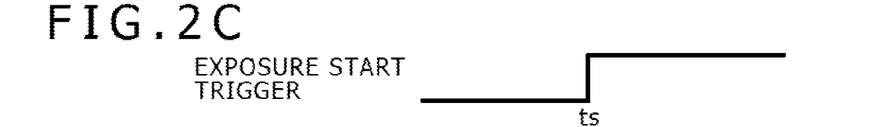

FIG. 2C is a timing chart of timing of issuing an exposure start trigger within the main body portion 101 of the imaging device 1. When the main body portion 101 of the imaging device 1 issues the exposure start trigger to an internal imaging element 44 (see FIG. 3 to be described later), the imaging element 44 starts exposure.

Figure 2D:
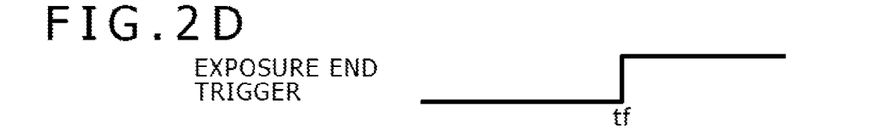

FIG. 2D is a timing chart of timing of issuing an exposure end trigger within the main body portion 101 of the imaging device 1. When the main body portion 101 of the imaging device 1 issues the exposure end trigger to the internal imaging element 44, the imaging element 44 ends the exposure.

The main body portion 101 of the imaging device 1 instructs the external flash 21 to perform preliminary light emission (hereinafter referred to as pre-light emission) with a predetermined amount of light emission before main light emission.

When an instruction for pre-light emission is issued, the external flash 21 performs pre-light emission at a predetermined light emission luminance. Then, the main body portion 101 of the imaging device 1 calculates a distance to a subject on the basis of reflected light of the pre-light emission. The main body portion 101 of the imaging device 1 calculates a light emission luminance L1 necessary for the main light emission on the basis of the distance to the subject. Incidentally, a concrete method for calculating the light emission luminance L1 will be described later. The main body portion 101 of the imaging device 1 notifies the calculated light emission luminance L1 to the external flash 21.

In this case, the external flash 21 has a table in which light emission delay time and light emission luminance are associated with each other in advance. Accordingly, the external flash 21 detects a light emission delay time Td corresponding to the notified light emission luminance L1 from the table. The light emission delay time Td is a time taken for the light emission luminance of the external flash 21 to reach a predetermined value from the issuance of a light emission trigger, and is a time taken for the external flash 21 to emit light at the light emission luminance L1 from the issuance of a light emission trigger in the case of FIGS. 2A to 2D. The external flash 21 notifies the detected light emission delay time Td to the main body portion 101 of the imaging device 1.

The main body portion 101 of the imaging device 1 issues each of a light emission trigger and an exposure start trigger indicating exposure start timing on the basis of the notified light emission delay time Td. In this case of FIGS. 2A to 2D, supposing that a time of issuance of the light emission trigger is a time te, a time of issuance of the exposure start trigger is a time ts, which is later than the time te by the light emission delay time Td.

The external flash 21 performs main light emission at the time te at which the light emission trigger is issued. In this case, as shown in FIG. 2A, for example, the waveform of light emission luminance provided by the main light emission of the external flash 21 is a curve C such that the light emission luminance does not immediately reach a peak at the time te, but gradually and monotonically increases, reaches the peak light emission luminance L1 with a predetermined delay, and then gradually and monotonically decreases.

When the main body portion 101 of the imaging device 1 issues the exposure start trigger at the time ts, the internal imaging element 44 start exposure. In the case of FIGS. 2A to 2D, exposure is started at the time ts at which the light emission luminance becomes the peak light emission luminance L1.

When the main body portion 101 of the imaging device 1 thereafter issues an exposure end trigger at a time tf that is later than the time ts, at which the exposure start trigger is issued, by an exposure time Tss, the internal imaging element 44 ends the exposure. Incidentally, the exposure time Tss is set at a predetermined value in advance. At this time, the exposure end trigger is also notified to the external flash 21.

The external flash 21 measures a light emission luminance L2 at a time that the exposure end trigger is received, that is, at a time that the exposure is ended (this time is substantially equal to the time tf at which the exposure end trigger is issued). The external flash 21 notifies the measured light emission luminance L2 to the main body portion 101 of the imaging device 1.

The main body portion 101 of the imaging device 1 calculates a shortage in an amount of light emission at the time of the main light emission on the basis of the previously calculated light emission luminance L1 and the light emission luminance L2 notified from the external flash 21.

Specifically, an amount of light emission necessary for the main body portion 101 of the imaging device 1 (that is, for light reception by the imaging element 44) which amount of light emission is provided by the main light emission of the external flash 21 is originally an amount of light emission GN (guide number) in a case where the external flash 21 continues light emission at a fixed light emission luminance L1 during the period of the exposure time Tss (that is, the time from the issuance of the exposure start trigger to the issuance of the exposure end trigger). However, actual light emission luminance provided by the main light emission of the external flash 21 is not fixed. The actual light emission luminance first monotonically increases after the light emission trigger is issued, reaches the peak light emission luminance L1 with a predetermined delay, and then monotonically decreases. Therefore, when the exposure time includes a period of the monotonic increase or monotonic decrease of the light emission luminance, the light emission luminance in the period means that the flash emits light with an amount of light emission that is short of the originally necessary amount of light emission.

Accordingly, the main body portion 101 of the imaging device 1 calculates the shortage in the amount of light emission in the period of the monotonic increase or monotonic decrease of the light emission luminance in the main light emission. That is, the exposure time is set within the period of the monotonic increase or the period of the monotonic decrease.

In the case of flat light emission in related art, a release request and the ripples of the flash are unrelated to each other. Thus, the relation between the period of the monotonic increase or monotonic decrease of the light emission luminance and the exposure time may change in each timing of a release request, so that it is very difficult to calculate the shortage in the amount of light emission.

On the other hand, the method according to the embodiment of the present technology appropriately adjusts the light emission trigger and the exposure start trigger to certain timing in response to a release request, and is thus able to hold constant the relation between the period of the monotonic increase or monotonic decrease of the light emission luminance and the exposure time irrespective of the timing of the release request. The main body portion 101 of the imaging device 1 according to the embodiment of the present technology can therefore calculate the shortage in the amount of light emission in the period of the monotonic increase or monotonic decrease of the light emission luminance.

Further, when the shortage in the amount of light emission occurs only in the period of the monotonic decrease of the light emission luminance, the shortage in the amount of light emission is calculated much more easily than in a case where the shortage in the amount of light emission appears in both the periods of the monotonic increase and the monotonic decrease of the light emission luminance, that is, in a case where the exposure time is set so as to straddle the peak light emission luminance L1. Accordingly, the timing of issuance of the exposure start trigger is preferably adjusted such that the exposure time does not straddle the peak light emission luminance L1.

Specifically, as shown in FIG. 2A, the exposure start trigger is preferably issued in timing in which the flash in the main light emission reaches the peak light emission luminance L1. In this case, the shortage in the amount of light emission occurs only in the period of the monotonic decrease of the luminance. In the case of FIG. 2A, the area of a region (region higher than the light emission curve C in the period Tss) r2 indicated by leftward downward hatching corresponds to the shortage in the amount of light emission. That is, in the case of FIG. 2A, an actual amount of light emission at the time of the main light emission corresponds to the area of a region (region lower than the light emission curve C in the period Tss) r1 indicated by rightward downward hatching. That is, the amount of light emission GN in the case of FIG. 2A corresponds to an amount of light emission of the area of a rectangle including the region r1 and the region r2. In actuality, however, the amount of light emission falls short by an amount corresponding to the area of the region r2.

Therefore, a taken image taken at the time of the main light emission (that is, a taken image taken after the exposure start trigger is issued) is darker by the shortage in the amount of light emission at the time of the main light emission, and thus needs to be corrected for brightness using a predetermined gain. Accordingly, the main body portion 101 of the imaging device 1 calculates the shortage in the amount of light emission at the time of the main light emission, which shortage corresponds to the area of the region r2, and calculates the gain on the basis of the shortage. The main body portion 101 of the imaging device 1 then subjects the image data of the taken image taken at the time of the main light emission to image processing for correcting the brightness using the calculated gain.

Thus, in the method according to the embodiment of the present technology, the main body portion 101 of the imaging device 1 adjusts the timing of issuing the light emission trigger and the exposure start trigger on the basis of the light emission delay time Td notified from the external flash 21 before the main light emission. That is, the main body portion 101 of the imaging device 1 adjusts the timing of issuing the light emission trigger and the exposure start trigger so that exposure is started in an appropriate stage among light emission stages of the flash irrespective of the timing of a release request. Thereby, proper light control can be achieved even at a high shutter speed.

Figure 3:
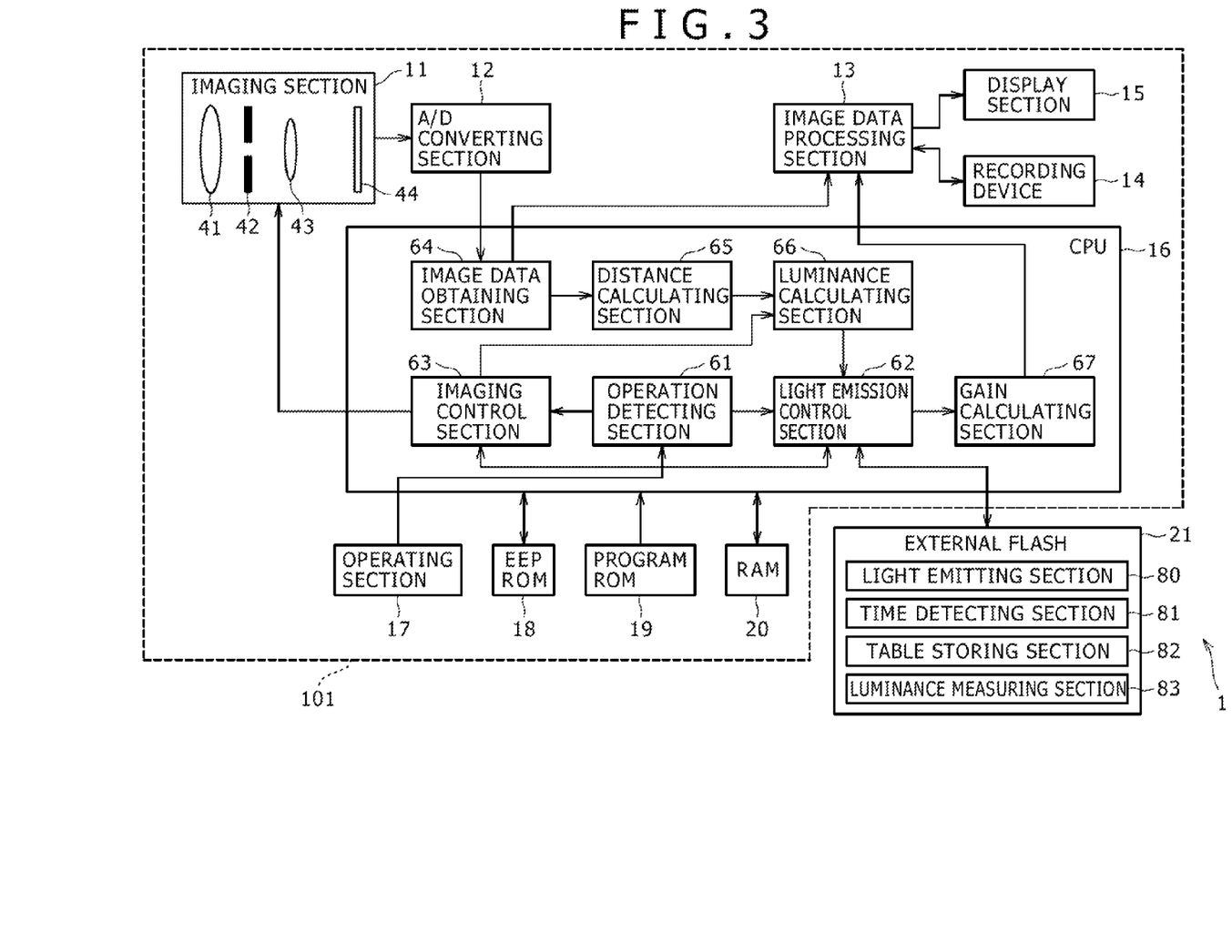
FIG. 3 is a block diagram showing an example of functional configuration of an imaging device.

FIG. 3 is a block diagram showing an example of functional configuration of the imaging device 1 to which the present technology is applied.

An imaging section 11 includes a zoom lens 41, a diaphragm 42, a focusing lens 43, and the imaging element 44. The zoom lens 41 is an optical lens for freely changing focal length in a certain range. The diaphragm 42 blocks a part of incident light that has passed through the zoom lens 41, and thereby adjusts an amount of light made incident on the imaging element 44 via the focusing lens 43. The focusing lens 43 is an optical lens for forming a subject image on a light receiving surface of the imaging element 44.

The imaging element 44 is for example formed by a CCD (Charge Coupled Device) sensor, a CMOS (Complementary Metal Oxide Semiconductor) sensor, or the like. The imaging element 44 receives light from a subject, which light is made incident on the imaging element 44 via the zoom lens 41, the diaphragm 42, and the focusing lens 43, and performs photoelectric conversion, by operating according to a timing signal supplied from a CPU (Central Processing Unit) 16. The imaging element 44 then supplies an analog image signal as an electric signal corresponding to an amount of received light to an A/D (Analog/Digital) converting section 12.

The A/D converting section 12 subjects the image signal as the analog signal from the imaging element 44 to A/D conversion, and supplies a digital signal obtained as a result of the A/D conversion as image data to the CPU 16.

The image data processing section 13 obtains the image data from the CPU 16, subjects the image data to various kinds of image processing as appropriate, and then supplies the image data to a display section 15 and a recording device 14. For example, when the image data processing section 13 receives an instruction for recording from the CPU 16, the image data processing section 13 subjects the image data obtained from the CPU 16 to compression coding processing using a JPEG (Joint Photographic Experts Group) system or the like, and makes the compression coded data obtained as a result of the compression coding processing recorded in the recording device 14.

In addition, the image data processing section 13 reads compression coded data recorded in the recording device 14, subjects the compression coded data to decompression decoding processing, and supplies the data of a taken image or the like obtained as a result of the decompression decoding processing to the display section 15. When the data of a taken image or the like is thus supplied to the display section 15, the taken image or the like is displayed on the display section 15.

The recording device 14 is for example a disk such as a DVD (Digital Versatile Disc) or the like, a semiconductor memory such as a memory card or the like, or another removable recording medium. The recording device 14 is easily detachable from the imaging device 1. The data of taken images, for example, is recorded in the recording device 14.

The CPU 16 controls various parts forming the imaging device 1 by executing a program recorded in a program ROM (Read Only Memory) 19, and performs various kinds of processing in response to a signal from an operating section 17.

In the present embodiment, the CPU 16 functions as an operation detecting section 61, a light emission control section 62, an imaging control section 63, an image data obtaining section 64, a distance calculating section 65, a luminance calculating section 66, and a gain calculating section 67 by executing a predetermined program.

The operation detecting section 61 detects an operation by a user on the operating section 17. The operation detecting section 61 detects the depression by the user of a release button included in the operating section 17 as a release request, and notifies the release request to the light emission control section 62 and the imaging control section 63.

When the release request is notified from the operation detecting section 61 to the light emission control section 62, the light emission control section 62 issues an instruction for pre-light emission to the external flash 21. The external flash 21 then performs pre-light emission at a predetermined light emission luminance.

When the release request is notified from the operation detecting section 61 to the imaging control section 63, the imaging control section 63 starts controlling imaging operation of the imaging section 11. Specifically, for example, the imaging control section 63 controls an autofocus process involving the focal length of the zoom lens 41, the aperture value of the diaphragm 42, and the driving of the focusing lens 43. Under such control of the imaging control section 63, the image signal supplied from the imaging section to the A/D converting section 12 and subjected to A/D conversion is supplied as image data to the image data obtaining section 64. The imaging control section 63 also supplies the aperture value at the time of imaging to the luminance calculating section 66.

When the image data obtaining section 64 obtains the image data from the A/D converting section 12, the image data obtaining section 64 supplies the image data to the image data processing section 13. In addition, when the image data obtaining section 64 obtains image data obtained by imaging at the time of the pre-light emission from the A/D converting section 12, the image data obtaining section 64 also supplies the image data to the distance calculating section 65.

At the time of the pre-light emission, the distance calculating section 65 calculates a distance from the imaging device 1 to the subject on the basis of the image data supplied from the image data obtaining section 64, and supplies the distance to the luminance calculating section 66.

The luminance calculating section 66 calculates the light emission luminance L1 necessary for main light emission on the basis of the aperture value supplied from the imaging control section 63 and the distance to the subject which distance is supplied from the distance calculating section 65.

Specifically, the luminance calculating section 66 calculates a product of the distance to the subject and the aperture value (Distance×Aperture value) as a amount of light emission GN necessitated by the main light emission. In this case, as described above, the amount of light emission GN corresponds to the area of the rectangle in FIG. 2A, and the exposure time Tss is determined in advance. The luminance calculating section 66 can therefore calculate the light emission luminance L1 by dividing the obtained amount of light emission GN by the exposure time Tss. The luminance calculating section 66 supplies the calculated light emission luminance L1 to the light emission control section 62.

The light emission control section 62 notifies the light emission luminance L1 supplied from the luminance calculating section 66 to the external flash 21 connected to the CPU 16. Then, a light emission delay time Td corresponding to the light emission luminance L1 is notified from the external flash 21 to the light emission control section 62.

The light emission control section 62 issues the light emission trigger on the basis of the light emission delay time Td notified from the external flash 21. When the light emission trigger is issued by the light emission control section 62, the external flash 21 performs the main light emission at the light emission luminance L1.

In addition, the imaging control section 63 issues the exposure start trigger in timing in which the light emission luminance in the main light emission by the external flash 21 reaches the peak light emission luminance L1, for example, on the basis of the light emission delay time Td notified from the external flash 21. When the exposure start trigger is issued from the imaging control section 63, the imaging element 44 starts exposure. When the exposure time Tss set in advance has passed from the time that the exposure start trigger was issued, the imaging control section 63 issues the exposure end trigger. When the exposure end trigger is issued by the imaging control section 63, the imaging element 44 ends the exposure.

The imaging control section 63 notifies the exposure end trigger to the external flash 21 via the light emission control section 62. Then, the light emission luminance L2 at the time that the exposure is ended is notified from the external flash 21 to the light emission control section 62.

The gain calculating section 67 calculates the shortage in the amount of light emission at the time of the main light emission as described above on the basis of the light emission luminance L1 calculated by the luminance calculating section 66 and the light emission luminance L2 notified to the light emission control section 62, and calculates a gain on the basis of the shortage. Specifically, in this case, as shown in FIGS. 2A and 2C, the exposure start trigger is issued in timing in which the peak light emission luminance L1 is reached in the main light emission by the external flash 21. Accordingly, the area of the region r2 obtained as a result of subtraction of the amount of light emission of the area of the region r1 from the amount of light emission GN is calculated as the shortage in the amount of light emission at the time of the main light emission, and the gain is calculated on the basis of the shortage. The gain calculating section 67 supplies the calculated gain to the image data processing section 13.

Using the gain supplied from the gain calculating section 67, the image data processing section 13 subjects the image data obtained by imaging by the imaging section 11 at the time of the main light emission and supplied to the image data processing section 13 via the image data obtaining section 64 to image processing for correcting the brightness.

Such a CPU 16 is connected with not only the A/D converting section 12 and the image data processing section 13 described above but also the operating section 17, an EEPROM (Electrically Erasable Programmable ROM) 18, the program ROM 19, a RAM (Random Access Memory) 20, and the external flash 21.

The operating section 17 is operated by the user, and supplies a signal corresponding to the operation to the CPU 16. The operating section 17 includes for example a power supply button, the release button, a zoom button, an operation button, and the like not shown in the figures.

The EEPROM 18 stores various kinds of data under control of the CPU 16, and retains the data even after power to the imaging device 1 is turned off. In other words, the EEPROM 18 stores data that needs to be retained even while power to the imaging device 1 is off, for example information set in the imaging device 1 or the like.

The program ROM 19 stores the program executed by the CPU 16, and further stores data necessary for the CPU 16 to execute the program. The RAM 20 temporarily stores the program and data that are necessary for the CPU 16 to perform various kinds of processing.

The external flash 21 includes a light emitting section 80, a time detecting section 81, a table storing section 82, and a luminance measuring section 83.

When an instruction for pre-light emission is issued from the CPU 16, the light emitting section 80 performs pre-light emission at a predetermined light emission luminance. In addition, when the light emission trigger is issued from the CPU 16, the light emitting section 80 performs main light emission at the light emission luminance notified after the pre-light emission.

The time detecting section 81 detects a light emission delay time Td corresponding to the light emission luminance L1 notified from the CPU 16 from the table stored in the table storing section 82. The time detecting section 81 notifies the detected light emission delay time Td to the CPU 16.

The table storing section 82 stores the table in which the light emission delay time and the light emission luminance are associated with each other in advance.

The luminance measuring section 83 measures the light emission luminance L2 at the time that the exposure end trigger is issued by the CPU 16. The luminance measuring section 83 notifies the measured light emission luminance L2 to the CPU 16.

Incidentally, the part of the imaging device 1 which part is obtained by excluding the external flash 21 from the imaging device 1 corresponds to the main body portion 101.

[Process of Imaging Device]

Figure 5:
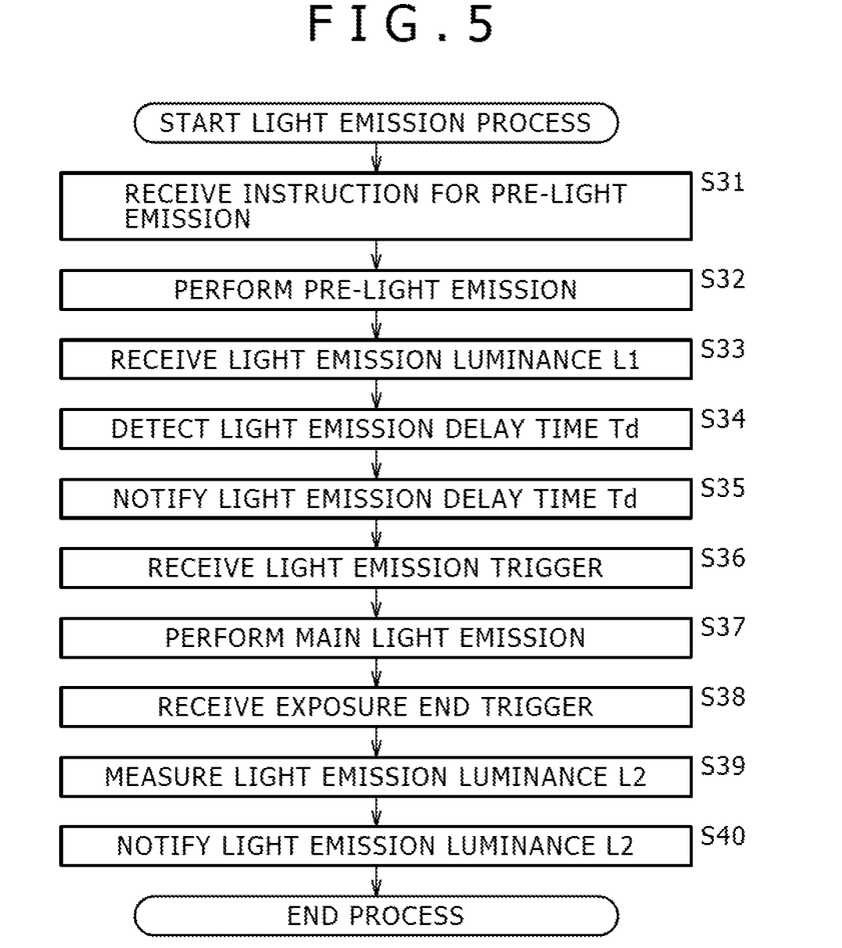
FIG. 5 is a flowchart of assistance in explaining an example of a flow of a light emission process.
Figure 6:
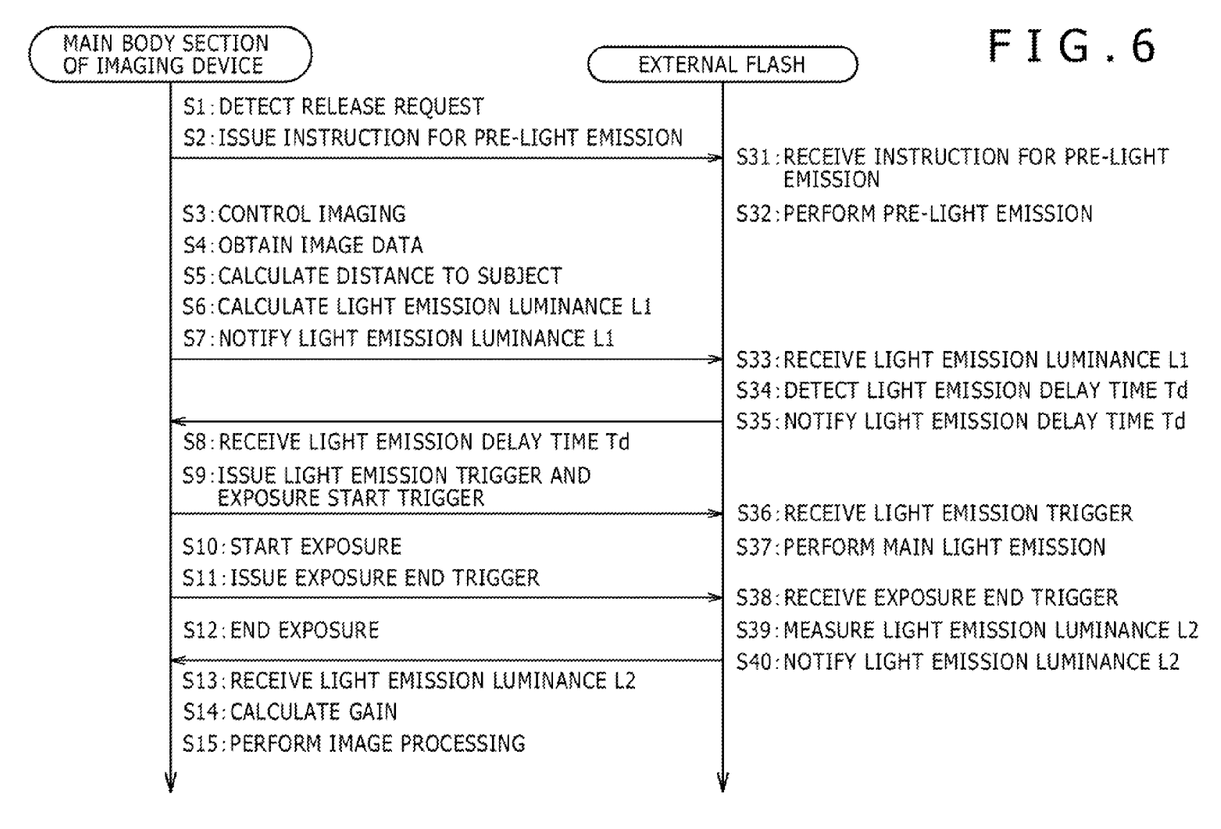
FIG. 6 is a diagram showing mutual relation between the process of a main body portion of the imaging device and the process of an external flash.

A flow of a process of the imaging device 1 having such a configuration will next be described with reference to FIGS. 4 to 6.

Figure 4:
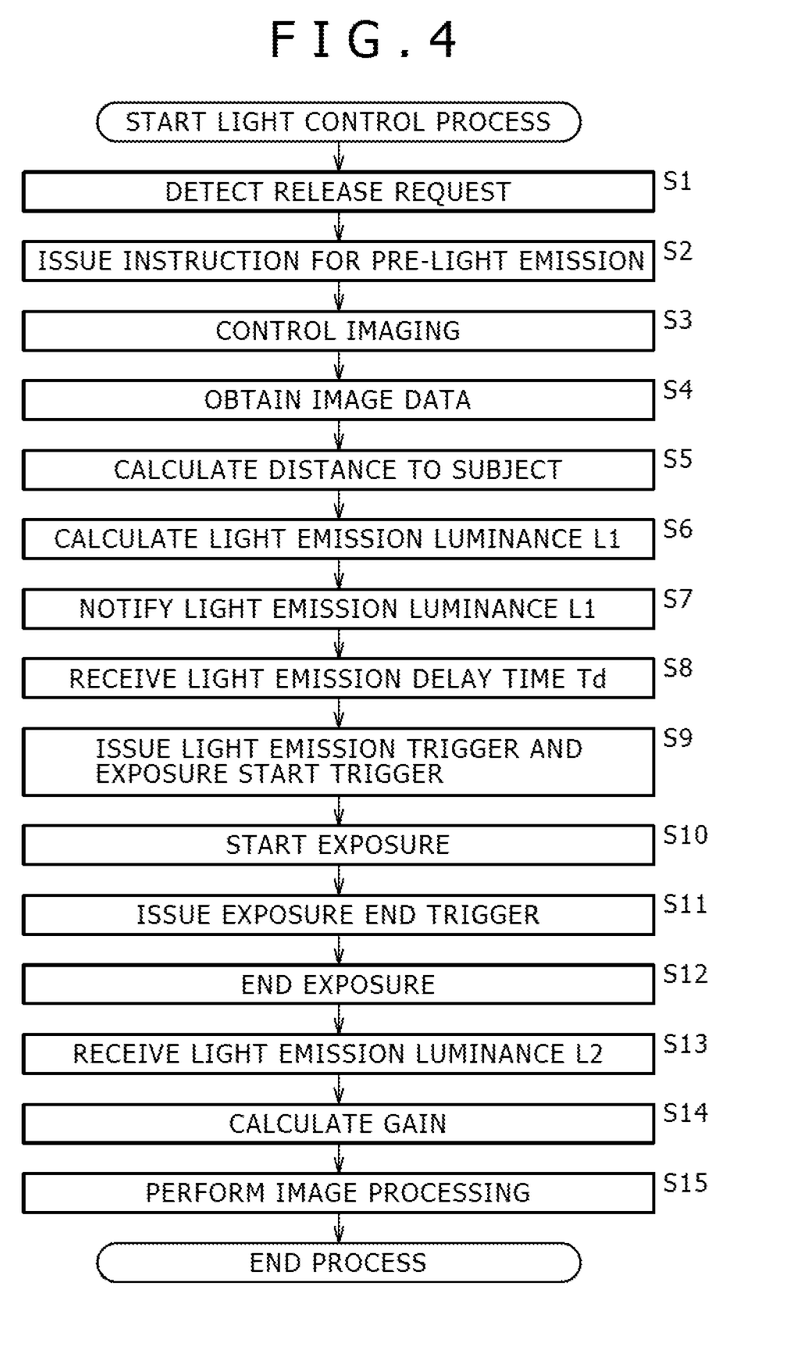
FIG. 4 is a flowchart of assistance in explaining an example of a flow of a light control process.

FIG. 4 is a flowchart of assistance in explaining an example of a flow of a light control process by the main body portion 101 of the imaging device 1. FIG. 5 is a flowchart of assistance in explaining an example of a flow of a light emission process by the external flash 21. FIG. 6 is a diagram of assistance in explaining relation between the process of the main body portion 101 of the imaging device 1 and the process of the external flash 21.

In step S1, the operation detecting section 61 of the main body portion 101 detects a release request made by operating the operating section 17. The detected release request is notified to the light emission control section 62 and the imaging control section 63.

In step S2, the light emission control section 62 issues an instruction for pre-light emission to the external flash 21.

Then, in step S31, the light emitting section 80 of the external flash 21 receives the instruction for pre-light emission from the CPU 16.

In step S32, the light emitting section 80 performs pre-light emission at a predetermined light emission luminance.

Then, in step S3, the imaging control section 63 of the main body portion 101 controls the imaging of the imaging section 11. An image signal obtained by the imaging at the time of the pre-light emission is subjected to A/D conversion in the A/D converting section 12, and thereby converted into image data. In addition, an aperture value at the time of the imaging is supplied to the luminance calculating section 66.

In step S4, the image data obtaining section 64 obtains the image data obtained by the imaging at the time of the pre-light emission from the A/D converting section 12.

In step S5, the distance calculating section 65 calculates a distance from the imaging device 1 to a subject on the basis of the image data at the time of the pre-light emission which image data is obtained by the image data obtaining section 64.

In step S6, the luminance calculating section 66 calculates a light emission luminance L1. That is, the luminance calculating section 66 calculates the light emission luminance L1 necessary for main light emission on the basis of the aperture value supplied from the imaging control section and the distance to the subject which distance is calculated by the distance calculating section 65. Specifically, the light emission luminance L1 is calculated by dividing the amount of light emission GN expressed by the product of the distance to the subject and the aperture value by the exposure time Tss.

In step S7, the light emission control section 62 notifies the light emission luminance L1 calculated by the luminance calculating section 66 to the external flash 21.

Then, in step S33, the external flash 21 receives the light emission luminance L1 notified from the CPU 16.

In step S34, the time detecting section 81 detects a light emission delay time Td corresponding to the light emission luminance L1 from the table stored in the table storing section 82.

In step S35, the time detecting section 81 notifies the detected light emission delay time Td to the CPU 16.

Then, in step S8, the light emission control section 62 of the main body portion 101 receives the light emission delay time Td notified from the external flash 21.

In step S9, on the basis of the light emission delay time Td, the light emission control section 62 issues a light emission trigger, and the imaging control section 63 issues an exposure start trigger.

In step S10, the imaging element 44 of the main body portion 101 starts exposure. Specifically, the exposure is started at the time that the light emission luminance reaches the peak light emission luminance L1. Incidentally, the light emission trigger issued in step S9 is also notified to the external flash 21.

Then, in step S36, the light emitting section 80 receives the light emission trigger issued by the CPU 16 in step S9.

In step S37, the light emitting section 80 performs main light emission at the light emission luminance L1.

In step S11, the imaging control section 63 of the display section 101 issues an exposure end trigger. Specifically, the imaging control section 63 issues the exposure end trigger when the exposure time Tss set in advance has passed from the time that the exposure start trigger was issued.

In step S12, the imaging element 44 ends the exposure. Incidentally, the exposure end trigger issued in step S11 is also notified to the external flash 21.

Then, in step S38, the external flash 21 receives the exposure end trigger issued by the CPU 16.

In step S39, the luminance measuring section 83 measures a light emission luminance L2 at the time that the exposure end trigger was issued by the CPU 16.

In step S40, the luminance measuring section 83 notifies the measured light emission luminance L2 to the CPU 16. The light emission process of the external flash 21 is thereby ended.

Then, in step S13, the light emission control section 62 of the main body portion 101 receives the light emission luminance L2 notified from the external flash 21.

In step S14, the gain calculating section 67 calculates a gain. Specifically, the gain calculating section 67 calculates a shortage in amount of light emission at the time of the main light emission on the basis of the light emission luminance L1 calculated by the luminance calculating section 66 and the light emission luminance L2 notified to the light emission control section 62, and calculates the gain on the basis of the shortage.

In step S15, the image data processing section 13 subjects image data obtained by imaging at the time of the main light emission to image processing for correcting brightness using the gain calculated by the gain calculating section 67. The light control process of the main body portion 101 is thereby ended.

Thus, in the method according to the embodiment of the present technology, the main body portion 101 of the imaging device 1 adjusts the timing of issuing the light emission trigger and the exposure start trigger on the basis of the light emission delay time Td notified from the external flash 21 before main light emission so that exposure is started in an appropriate stage among light emission stages of the flash. Thereby, proper light control can be achieved even at a high shutter speed.

In the above-described example, the light emission process is performed by the external flash 21. However, the flash is not limited to an external flash, but may be incorporated in the main body portion 101. In this case, the CPU 16 includes the time detecting section 81 and the luminance measuring section 83. In addition, the EEPROM 18 includes the table storing section 82.

[Application of Present Technology to Program]

The series of processes described above can be not only carried out by hardware but also carried out by software.

When the series of processes is to be carried out by software, a program constituting the software is installed from a network or a recording medium onto a computer incorporated in dedicated hardware or a general-purpose personal computer, for example, that can perform various kinds of functions by installing various kinds of programs thereon.

For example, the program to be executed by the CPU 16 can also be installed (stored) in the program ROM 19 in advance. In addition, the recording device 14 storing the program can also be provided as a packaged medium to the user of the imaging device 1. In this case, the program is read from the recording device 14 provided as a packaged medium and installed in the EEPROM 18 under control of the CPU 16.

In addition, though not shown, when the imaging device 1 has a function of communicating via a network such as the Internet or the like, the program to be executed by the CPU 16 is directly downloaded from a download site to the imaging device 1 or downloaded by a computer not shown in the figures and supplied to the imaging device 1, and thereby installed in the EEPROM 18. In addition, the program can be provided via a wire or wireless transmission medium such as a local area network, the Internet, digital satellite broadcasting, or the like.

It is to be noted that the program executed by the computer may be a program for performing the processes in time series in the order described in the present specification, or may be a program for performing the processes in parallel or in necessary timing such as at a time that a call is made, for example.

Embodiments of the present technology are not limited to the foregoing embodiments, but various changes can be made without departing from the spirit of the present technology.

For example, the present technology can adopt a configuration of cloud computing in which one function is shared between a plurality of devices and processed in conjunction with each other via a network.

In addition, each of the steps described in the above flowcharts can be not only performed by one device but also shared and performed by a plurality of devices.

Further, when one step includes a plurality of processes, the plurality of processes included in the one step can be not only performed by one device but also shared and performed by a plurality of devices.

Incidentally, the present technology can also adopt the following constitutions.

(1) An imaging device including:

a light emission control section for obtaining a delay time from issuance to a flash of a light emission trigger indicating light emission start timing of the flash to reaching of a predetermined value by light emission luminance of the flash an imaging control section for controlling exposure start timing on a basis of the delay time; and a correction amount calculating section for calculating, on the basis of the delay time, an amount of correction used when brightness of a taken image taken from the exposure start timing is corrected.

(2) The imaging device according to the above (1), further including a light emission luminance calculating section for calculating the predetermined value for the light emission luminance of the flash on a basis of a distance from the imaging device to a subject, wherein when the flash detects the delay time corresponding to the predetermined value for the light emission luminance of the flash, the predetermined value being calculated by the light emission luminance calculating section, from a table showing relation between the light emission luminance and the delay time, the light emission control section then obtains the delay time detected by the flash.

(3) The imaging device according to the above (1) or (2), wherein the imaging control section sets the exposure start timing on a basis of timing in which the delay time has passed from the issuance of the light emission trigger.

(4) The imaging device according to any one of the above (1) to (3), wherein the imaging control section sets timing in which a predetermined exposure time has passed from the exposure start timing as exposure end timing, and the correction amount calculating section calculates the amount of correction on a basis of the light emission luminance in the exposure start timing and the light emission luminance in the exposure end timing.

(5) The imaging device according to any one of the above (1) to (4), wherein the predetermined exposure time is set within a period of monotonic increase of the light emission luminance of the flash after the light emission trigger is issued or within a period of monotonic decrease of the light emission luminance of the flash after the light emission luminance monotonically increases and reaches a peak.

(6) The imaging device according to any one of the above (1) to (5), wherein the imaging control section sets the exposure start timing on a basis of timing in which the light emission luminance of the flash reaches the peak.

The present technology is applicable to information processing devices capable of controlling imaging operation.

The present disclosure contains subject matter related to that disclosed in Japanese Priority Patent Application JP 2012-137058 filed in the Japan Patent Office on Jun. 18, 2012, the entire content of which is hereby incorporated by reference.

What is claimed is:

1. An imaging device comprising:
a light emission control section configured to (i) obtain a delay time from issuance of a light emission trigger indicating light emission start timing of a flash to reaching of a predetermined value by light emission luminance of the flash and (ii) to adjust timing of the light emission trigger on a basis of the delay time;
an imaging control section configured to control exposure start timing on the basis of the delay time; and
a correction amount calculating section configured to calculate an amount of correction used when brightness of a taken image taken from the exposure start timing is corrected,
the predetermined value being a peak value of the light emission luminance such that the delay time is an amount of time from the issuance of the light emission trigger to reaching the peak value of the light emission luminance, and
the light emission control section configured to adjust the start timing of the light emission trigger by the delay time and the imaging control section configured to control the exposure start timing so as to occur after an amount of time corresponding to the delay time has passed since the start timing of the light emission trigger.

2. The imaging device according to claim 1,
wherein the imaging control section sets timing in which a predetermined exposure time has passed from the exposure start timing as exposure end timing, and
the correction amount calculating section calculates the amount of correction on a basis of the light emission luminance in the exposure start timing and the light emission luminance in the exposure end timing.

3. The imaging device according to claim 2,
wherein the predetermined exposure time is set within a period of monotonic increase of the light emission luminance of the flash after the light emission trigger is issued or within a period of monotonic decrease of the light emission luminance of the flash after the light emission luminance monotonically increases and reaches the peak value.

4. The imaging device according to claim 1,
the correction amount calculating section being configured to calculate a shortage of an amount of light emission as the amount of correction, and
the shortage being representative of a difference between a first area and a second area on a light emission luminance versus time curve, in which the first area being a rectangular-shaped area equal to a product of the peak value of the light emission luminance and a time period between the exposure start timing and an exposure end timing, and in which the second area being an area under the light emission luminance versus time curve in the time period between the exposure start timing and an exposure end timing.

5. An imaging method comprising:
obtaining a delay time from issuance of a light emission trigger indicating light emission start timing of a flash to reaching of a predetermined value by light emission luminance of the flash and adjusting a start timing of the light emission trigger by the delay time;
controlling exposure start timing so as to occur after an amount of time corresponding to the delay time has passed since the start timing of the light emission trigger; and
calculating an amount of correction used when brightness of a taken image taken from the exposure start timing is corrected,
the predetermined value being a peak value of the light emission luminance such that the delay time is an amount of time from the issuance of the light emission trigger to reaching the peak value of the light emission luminance.

6. A non-transitory computer readable recording medium having stored thereon a program for making a computer function as:
a light emission control section configured (i) to obtain a delay time from issuance of a light emission trigger indicating light emission start timing of a flash to reaching of a predetermined value by light emission luminance of the flash and (ii) to adjust timing of the light emission trigger on a basis of the delay time;
an imaging control section configured to control exposure start timing on the basis of the delay time; and
a correction amount calculating section configured to calculate an amount of correction used when brightness of a taken image taken from the exposure start timing is corrected,
the predetermined value being a peak value of the light emission luminance such that the delay time is an amount of time from the issuance of the light emission trigger to reaching the peak value of the light emission luminance, and
the light emission control section configured to adjust a start timing of the light emission trigger by the delay time and the imaging control section configured to control the exposure start timing so as to occur after an amount of time corresponding to the delay time has passed since the start timing of the light emission trigger.

* * * * *